(12) United States Patent
Kim et al.

(10) Patent No.: US 7,955,730 B2
(45) Date of Patent: Jun. 7, 2011

(54) SECONDARY BATTERY

(75) Inventors: Jong Ku Kim, Yongin-si (KR); Soon Ki Woo, Yongin-si (KR); Jin Wook Kim, Yongin-si (KR); Young Taek Kim, Yongin-si (KR); Youn Han Chang, Yongin-si (KR); Sang Bong Nam, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 1073 days.

(21) Appl. No.: 11/436,401

(22) Filed: May 18, 2006

(65) Prior Publication Data

US 2006/0275659 A1    Dec. 7, 2006

(30) Foreign Application Priority Data

May 18, 2005    (KR) .................... 10-2005-0041423

(51) Int. Cl.
*H01M 4/00* (2006.01)
(52) U.S. Cl. .......... 429/186; 429/94; 429/130; 429/208; 429/164
(58) Field of Classification Search .................. 429/208, 429/94, 163, 186
See application file for complete search history.

(56) References Cited

U.S. PATENT DOCUMENTS

| 5,047,068 A | 9/1991 | Stoklosa |
| 5,882,815 A | 3/1999 | Tagawa |
| 5,925,482 A | 7/1999 | Yamashita |
| 6,020,084 A * | 2/2000 | Romero et al. ................. 429/94 |
| 6,869,725 B2 | 3/2005 | Iwanaga et al. |
| 2003/0148175 A1* | 8/2003 | Iwanaga et al. ............... 429/130 |
| 2003/0198863 A1 | 10/2003 | Murashige et al. |
| 2006/0263673 A1* | 11/2006 | Kim et al. ....................... 429/40 |

FOREIGN PATENT DOCUMENTS

| EP | 0872909 A1 | 10/1998 |
| JP | 04-332481 | 4/1993 |
| JP | 08-250155 | 9/1996 |
| JP | 11-067263 | 3/1999 |
| JP | 11-224689 | 8/1999 |
| JP | 2003-092148 | 3/2003 |
| KR | 2003-0043745 | 6/2003 |

* cited by examiner

*Primary Examiner* — Ula C Ruddock
*Assistant Examiner* — Amanda Barrow
(74) *Attorney, Agent, or Firm* — Knobbe Martens Olson & Bear LLP (57) ABSTRACT

Disclosed is a cylindrical lithium secondary battery capable of improving the stability thereof against the external pressure, The cylindrical lithium secondary battery includes an electrode assembly and a core. The electrode assembly includes a first electrode sheet, a second electrode sheet and a separator interposed between the first and second electrode sheets, which are rolled together about an axis. The electrode assembly defines a space. The core has a tubular shape provided with a gap. The core includes at least one reinforcing structure extending in a direction extending along the axis. The core is inserted into the space of the electrode assembly. A housing receives the electrode assembly and core.

13 Claims, 10 Drawing Sheets

SECONDARY BATTERY

CROSS-REFERENCE TO RELATED PATENT APPLICATIONS

This application claims the priority of Korean Patent Application No. 2005-0041423, filed on May. 18, 2005, in the Korean Intellectual Property Office, the disclosure of which is incorporated herein by reference in its entirety.

BACKGROUND OF THE INVENTION

1. Field of the Invention

The present invention relates to a secondary battery, and more particularly, the present invention relates to a lithium secondary battery.

2. Description of the Related Technology

Lithium secondary batteries mainly use lithium-based oxide as positive electrode active materials and carbon as negative electrode active materials. In general, lithium batteries are classified into liquid electrolyte batteries and polymer electrolyte batteries according to the kind of the electrolytes used therefor. The liquid electrolyte batteries are called "lithium ion batteries" and the polymer electrolyte batteries are called "lithium polymer batteries". In addition, the lithium secondary batteries can be fabricated with various shapes, such as cylindrical lithium secondary batteries, square type lithium secondary batteries, or pouch type lithium secondary batteries.

Typically, the cylindrical lithium secondary battery includes an electrode assembly comprising a positive electrode plate coated with a positive electrode active material, a negative electrode plate coated with a negative electrode active material and a separator interposed between the positive electrode plate and the negative electrode plate for preventing short circuit while allowing the movement of lithium-ions exclusively, a cylindrical case for receiving the electrode assembly, and an electrolyte contained in the cylindrical case in order to enable lithium-ions to move.

Such a cylindrical lithium secondary battery is fabricated as follows: First, the electrode assembly is prepared by stacking the positive electrode plate, which is coated with the electrode plate, which is coated with the negative electrode active material and connected to a negative electrode tab, and a separator and then rolling or winding the positive electrode plate, the negative electrode plate and the separator into a cylindrical roll. After that, the cylindrical electrode assembly is fixed in the cylindrical case and the electrolyte is filled into the cylindrical case. Then, the cylindrical case is sealed, thereby obtaining the cylindrical lithium secondary battery.

In general, a cavity is formed at a center of the electrode assembly of the cylindrical lithium secondary battery. Such a cavity may cause the electrode assembly to be released or easily deformed. Thus, there has been a need to minimize the release or deformation of the electrode assembly.

SUMMARY OF CERTAIN ASPECTS

One aspect of the invention provides a battery, which comprises: a housing; an electrode assembly enclosed in the housing, the electrode assembly comprising a first electrode sheet, a second electrode sheet and at least one separator, which are rolled together generally about an axis to form a roll, the at least one separator being dielectrically interposed between the first and second electrode sheets in the roll; and a core placed in the center of the roll, the core comprising a substantially tubular-shaped wall surrounding the axis, the tubular-shaped wall comprising an outer surface facing the roll and an inner surface facing the axis, the core comprising at least one reinforcing structure formed in the tubular-shaped wall, the reinforcing structure being elongated in a direction extending along the axis. The direction may be substantially parallel to the axis. The direction may be substantially tilted from the axis while extending along the axis.

In the foregoing battery, the at least one reinforcing structure may comprise at least one recess formed on the outer surface. The at least one reinforcing structure may comprise at least one bulge formed on the inner surface. The at least one reinforcing structure may comprise at least one wrinkle in the wall, and wherein the at least one wrinkle comprises a recess on the outer surface and a bulge on the inner surface.

Still in the foregoing battery, the substantially tubular-shaped wall may comprise a first edge extending along the axis and a second edge extending along the axis and the first and second edges generally face each other with a gap therebetween. The at least one comprise a first edge extending along the axis and a second edge extending along the axis and the first and second edges generally face each other with a gap therebetween. The at least one reinforcing structure may comprise a flange along at least one of the first and second edges, and wherein the flange extends along the at least one of the first and second edges. The flange may comprise a portion of the wall in the vicinity of the at least one of the first and second edges, and wherein the portion bends inwardly toward the axis.

Further still in the foregoing battery, the at least one reinforcing structure may comprise a first flange along the first edge and a second flange along the second edge, and wherein the first flange and second flange extend substantially parallel to each other. The first flange may comprise an inwardly bent portion of the wall in the vicinity of the first edge, wherein the first flange comprises a first outer surface extended from the outer surface of the wall, wherein the second flange comprises an inwardly bent portion of the wall in the vicinity of the second edge, wherein the second flange comprises a second outer surface extended from the outer surface of the wall, wherein the first and second outer surfaces form an angle between tangential lines thereof, and wherein the angle is from about 60° to about 130°. The core may comprise two or more reinforcing structures elongated in a direction extending along the axis, wherein two of the reinforcing structures are distanced from each other such that the two reinforcing structures have an angle therebetween about the axis, and wherein the angle is from about 120° to about 180°. The roll may have a length along the axis, and wherein the core has a length along the axis, which is from about 90 to about 110% of the length of the roll. The core may comprise a substantially cylindrical portion.

Another aspect of the invention provides a method of making a battery, which comprise: providing an electrode assembly and a core, wherein the electrode assembly comprises a first electrode sheet, a second electrode sheet and at least one separator, which are rolled together generally about an axis to form a roll, wherein the at least one separator is dielectrically interposed between the first and second electrode sheets in the roll, wherein a core placed in the center of the roll, wherein the core comprises a substantially tubular-shaped wall surrounding the axis, wherein the tubular-shaped wall comprises an outer surface facing the roll and an inner surface facing the axis, wherein the core comprises at least one reinforcing structure formed in the tubular-shaped wall, wherein the reinforcing structure is elongated in a direction extending along the axis; and enclosing the electrode assembly and the core in a housing, thereby producing the foregoing battery.

In the foregoing method, providing may comprise providing the electrode assembly comprising the roll with a space in the center of the roll, and inserting the core into the space. Providing may comprise rolling the first electrode sheet, the second electrode sheet and the at least one separator around the core. Enclosing may comprise positioning the electrode assembly within the housing, the electrode assembly comprising the roll with a space in the center of the roll, and inserting the core into the space.

Still in the foregoing method the at least one reinforcing structure may comprise at least one wrinkle in the wall, and wherein the at least one wrinkle comprises a recess on the outer surface and a bulge on the inner surface. The substantially tubular-shaped wall may comprise a first edge extending along the axis and a second edge extending along the axis, wherein the first and second edges generally facing each other with a gap therebetween, wherein the at least one reinforcing structure comprises a first flange along the first edge and a second flange along the second edge, and wherein the first flange and second flange extend substantially parallel to each other. The direction ma be substantially tilted from the axis while extending along the axis.

Still another aspect of the present invention provides a cylindrical lithium secondary battery, in which at least one groove part is formed lengthwise along a core member such that deformation can be distributed over the whole area of the core member when external pressure is applied to the core member, thereby improving stability of the secondary battery against the external pressure.

Still another aspect of the present invention provides a cylindrical lithium secondary battery comprising: an electrode assembly including a first electrode plate, a second electrode plate and a separator interposed between the first and second electrode plates, the electrode assembly being formed at a center thereof with a cavity; a core member having a tubular shape provided with a slit formed lengthwise along the core member and including at least one groove part formed lengthwise along the core member, the core member being inserted into the cavity of the electrode assembly; a case having a cavity for receiving the electrode assembly; and a cap assembly coupled to an upper portion of the case to seal the case.

According to an exemplary embodiment of the present invention, the core member is provided with one groove part aligned in opposition to the slit on a circumference of a cross sectional plane of the core member. The core member is preferably provided with two groove parts, which are symmetrically formed lengthwise along the core member about a transverse axis of the slit on a circumference of a cross sectional plane of the core member. More preferably, a central angle defined by two groove parts is in a range of 120 to 240°. Both side ends of the core member defining the slit are bent toward an inner portion of the core member. More preferably, both side ends of the core member are bent toward the inner portion of the core member while forming an inclination angle equal to or less than 120° therebetween. The core member has a height corresponding to approximately 90 to 110% of a height of the electrode assembly.

Another aspect of the present invention provides a cylindrical lithium secondary battery comprising: an electrode assembly including a first electrode plate, a second electrode plate and a separator interposed between the first and second electrode plates; a core member inserted into a cavity formed at a center of the electrode assembly, the core member having a tubular shape provided with a slit formed lengthwise along the core member and including at least one deformation distribution member subject to external pressure; a case having a cavity for receiving the electrode assembly; and a cap assembly coupled to an upper portion of the case to seal the case.

According to an exemplary embodiment of the present invention, the core member is provided with one deformation distribution member aligned in opposition to the slit on a circumference of a cross sectional plane of the core member. The core member can be provided with two deformation distribution members, which are symmetrically formed lengthwise along the core member about a transverse axis of the slit on a circumference of a cross sectional plane of the core member. More preferably, a central angle defined by the two groove parts is in a range of 120 to 240°.

BRIEF DESCRIPTION OF THE DRAWINGS

The above and other features and advantages of the invention will be more apparent from the following detailed description taken in conjunction with the accompanying drawings in which:

FIG. 2b is a sectional view taken along line A-A shown in FIG. 2a;

FIG. 2c is a sectional view taken along line B-B shown in FIG. 2a;

FIG. 3b is a sectional view taken along line C-C shown in FIG. 3a;

FIG. 4b is a sectional view taken along line D-D shown in FIG. 4a;

DETAILED DESCRIPTION OF EMBODIMENTS

Hereinafter, various features of the present invention will be described in detail in terms of embodiments with reference to the accompanying drawings. In the following description and drawings, the same reference numerals are used to designate the same or similar components, so repetition of the description on the same or similar components will be omitted.

Figure 1:
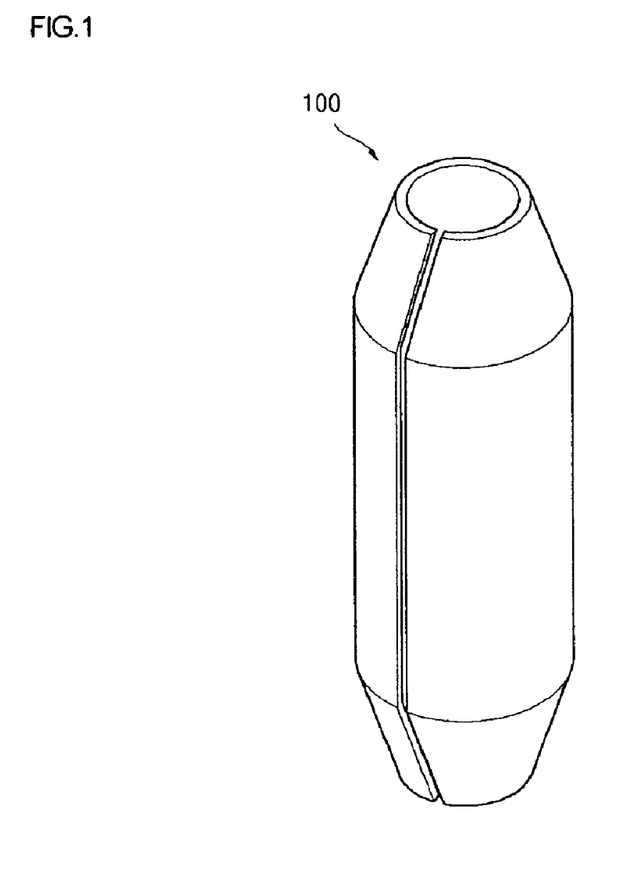
FIG. 1 is a perspective view illustrating a core member.

FIG. 1 shows the insertion of a core member 100 into the cavity formed at the center of the electrode assembly. The core member 100 is preferably fabricated by winding a plate in the form of a tube, in which a slit or gap is formed lengthwise along the tube. Such a core member 100 may be deformed or broken when external pressure is applied thereto. If the core member 100 is deformed or broken, the separator of the electrode assembly may also be deformed or broken, thereby causing the short circuit between the positive electrode plate or sheet and the negative electrode plate or sheet. Such a short circuit may cause the breakage or explosion of the cylindrical lithium secondary battery.

In addition, according to the possible explanation on the nature of the deformation, although not limited thereto, when external pressure is applied to the core member 100, the deformation may be concentrated on one spot of the core member 100. That is, the deformation of the core member 100 is concentrated on one spot of the core member 100, to which the external pressure is applied, so that the core member 100 applies pressure to one spot of the electrode assembly, thereby causing the serious of the electrode assembly.

Figure 2A:
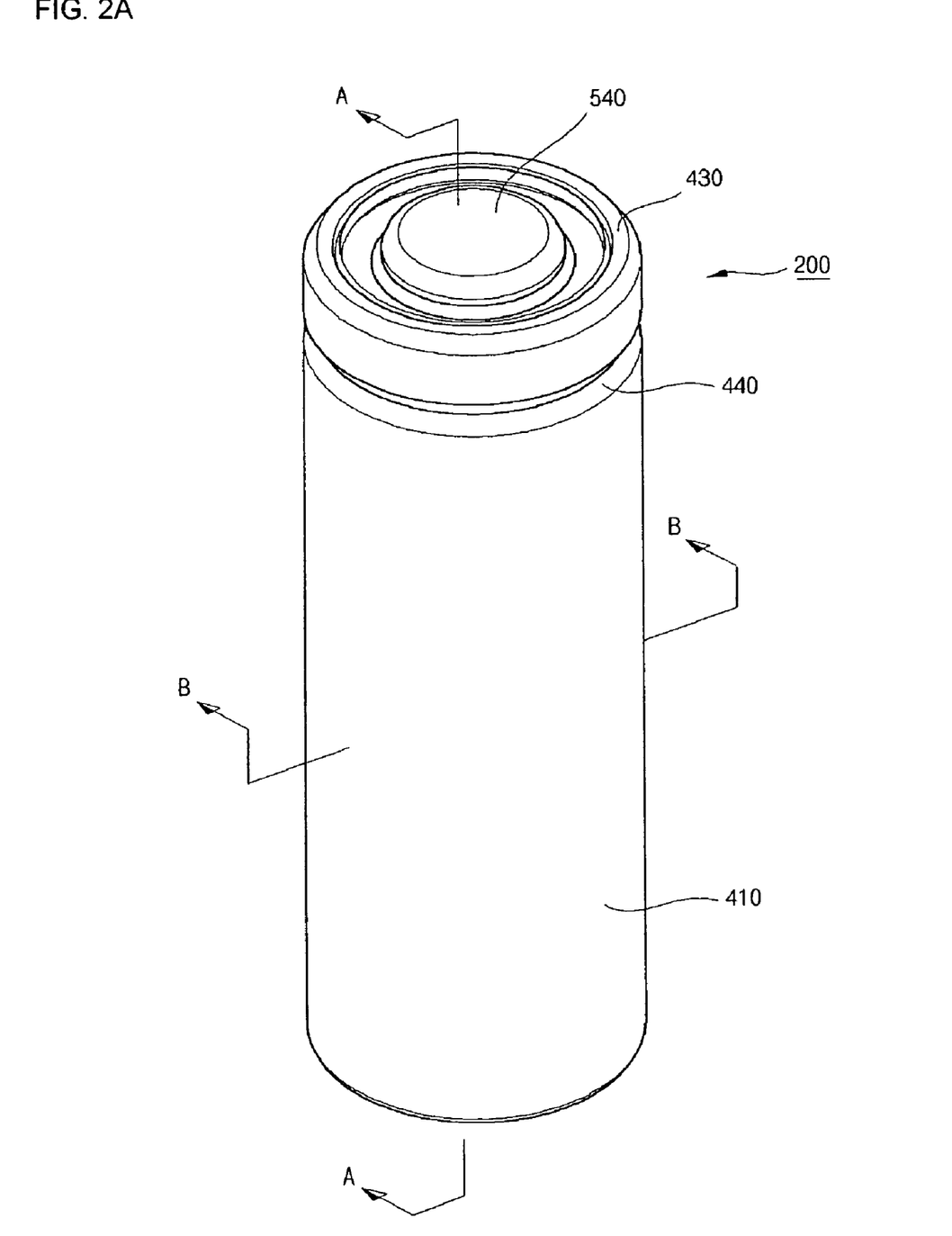
FIG. 2a is a perspective view illustrating a cylindrical lithium secondary battery according to one embodiment of the present invention.
Figure 2B:
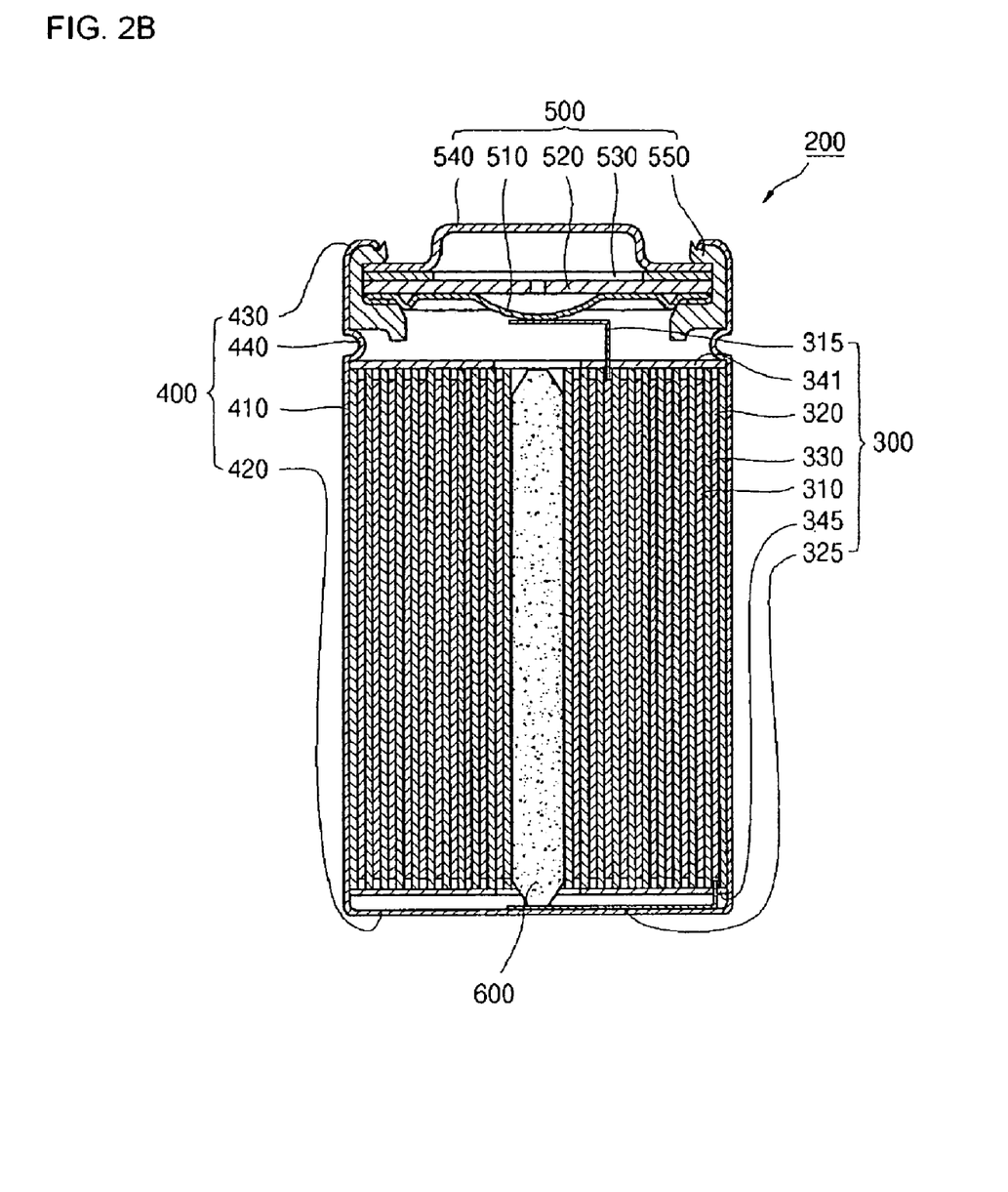
Figure 2C:
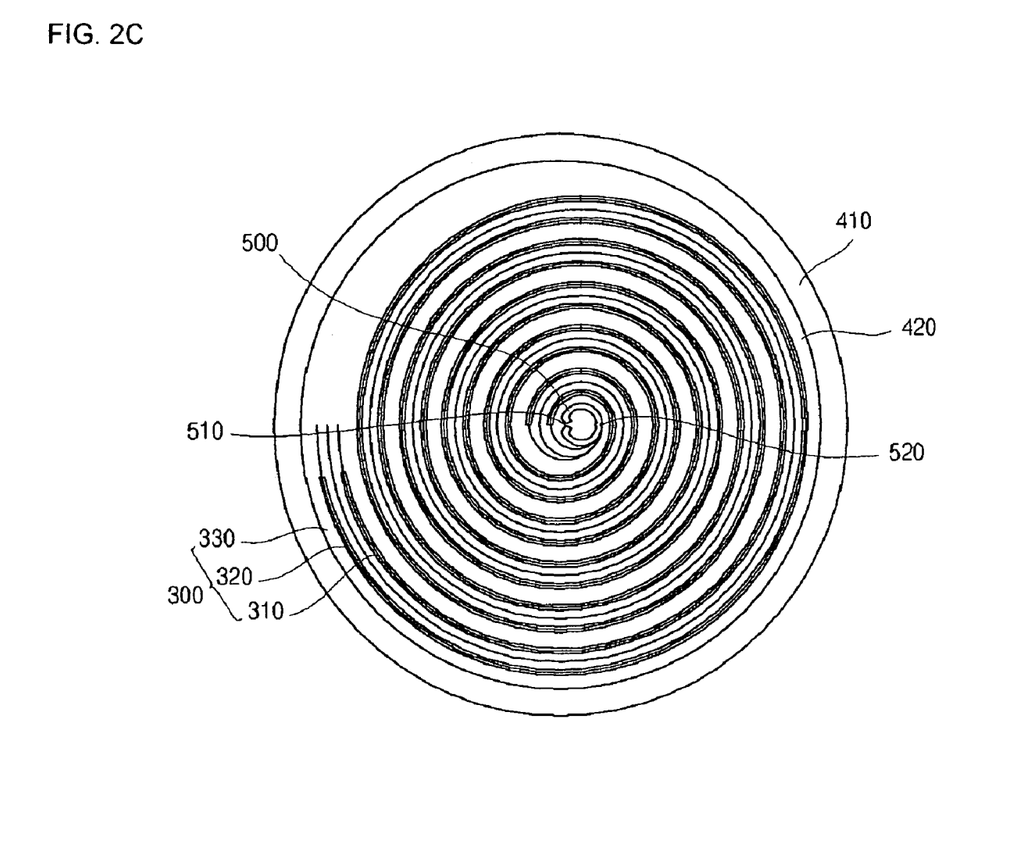

FIG. 2a is a perspective view illustrating a cylindrical lithium secondary battery according to one embodiment of the present invention, FIG. 2b is a sectional view taken along line A-A shown in FIG. 2a, and FIG. 2c is a sectional view taken along line B-B shown in FIG. 2a.

As shown in FIGS. 2a to 2c, the cylindrical lithium secondary battery 200 according to one embodiment of the present invention includes an electrode assembly 300 generating the potential difference during charge/discharge operations, a cylindrical case 400 for receiving the electrode assembly 300, a cap assembly 500 assembled to an upper portion of the cylindrical case 400 such that the electrode assembly 300 is not separated from the cylindrical case 400, and a core member 600 installed in a cavity formed at a center of the electrode assembly 300.

The electrode assembly 300 includes a first electrode plate or sheet 310 coated with either a positive active material or a negative active material (preferably, the positive active material), a second electrode plate or sheet 320 coated with either a positive active material or a negative active material (preferably, the negative active material), and a separator 330 interposed between the first and second electrode plates 310 and 320 in order to prevent the short circuit between the first and second electrode plates 310 and 320 while allowing the movement of lithium ions, exclusively. The first electrode plate 310, the second electrode plate 320 and the separator 330 are cylindrically wound and accommodated in the cylindrical case 400. In addition, a first electrode tab 315 made from Al is attached to the first electrode plate 310 and protrudes upward from the first electrode plate 315 by a predetermined distance. A second electrode tab 325 made from Ni is attached to the second electrode plate 320 and protrudes downward from the second electrode plate 320 by a predetermined distance. Although the first and second electrode tabs 315 and 325 are preferably made from Al and Ni, respectively, the present invention does not limit the materials for the first and second electrode tabs 315 and 325. In addition, upper and lower insulating plates 341 and 345 can be attached to upper and lower portions of the electrode assembly 300 in order to prevent the electrode assembly 300 from directly making contact with the cap assembly 500 or the cylindrical case 400.

The cylindrical case 400 has a cylindrical body 410 having a predetermined diameter and being formed with a cavity for receiving the electrode assembly 300. The cylindrical case 400 includes a lower surface 420 sealing a bottom of the cylindrical body 410. An upper surface of the cylindrical body 410 is opened so as to allow the electrode assembly 300 to be accommodated in the cylindrical case 400. One of the first and second electrode tabs 315 and 325 (preferably, the second electrode tab 325) is attached to the center of the lower surface 420 of the cylindrical case 420 so that the cylindrical case 400 serves, for example, as a negative electrode terminal similar to the second electrode plate 320. In addition, the cylindrical case 400 is generally made from Al, Fe or an alloy thereof. The cylindrical case 400 is provided with a cramping portion 430, which is curled in one direction to press the cap assembly 500 downward from the upper portion of the cap assembly 500, and a beading part 440, which is dented to press the cap assembly 500 upward from the lower portion of the cap assembly 500.

The cap assembly 500 includes a conductive safety vent plate 510, to which the first electrode tab 315 is welded and the shape of which is deformed upon overcharge or abnormal generation of heat, a printed circuit board (PCB) 520 electrically and mechanically connected to an upper portion of the safety vent 510 such that circuits thereof can be disconnected when the safety vent 510 is deformed, a positive thermal coefficient device 530 electrically and mechanically connected to an upper portion of the PCB 520 such that circuits thereof can be disconnected when a temperature rises above a predetermined temperature, a conductive electrode cap 540 electrically and mechanically connected to an upper portion of the positive thermal coefficient device 530 in order to apply current to an external device, and an insulating gasket 550 surrounding lateral potions of the safety vent 510, the PCB 520, the positive thermal coefficient device 530 and the electrode cap 540 while insulating the above elements from the cylindrical case 400. At this time, the electrode cap 540 is bonded to one of the first and second electrode tabs 315 and 325 (preferably, the first electrode tab 315) so that the electrode cap 540 serves, for example, as a positive electrode terminal similar to the first electrode plate 310.

The core member 600 is inserted into the cavity formed at the center of the winding type electrode assembly 300 in order to prevent the winding type electrode assembly 300 from being released or deformed caused by external impact applied to the winding type electrode assembly 300. The core member 600 has a substantially tubular shape. In addition, a slit 610 is formed lengthwise along the core member 600. Preferably, both side ends of the core member 600 defining the slit 610 therebetween are bent toward an inner portion of the core member 600. The core member 600 having the tubular shape is provided at an outer wall thereof with at least one wrinkle or groove part 620 as a reinforcing structure.

In addition, the core member 600 has a height corresponding to approximately about 90 to about 110% of a height of the electrode assembly 300. A lower end of the core member 600 is positioned on the second electrode tab 325. Although it is not illustrated in the figures, an electrolyte is contained in the cylindrical case 400 so as to allow lithium ions to move within the electrode assembly 300. The electrolyte serves as a medium for moving the lithium ions generated from the positive and negative electrodes in the secondary battery due to electro-chemical reaction during the charge/discharge operations. The electrolyte includes a non-aqueous organic electrolyte, which is a mixture of lithium salts and high purity organic solvent. In addition, the electrolyte may include polymer, such as a polymer electrolyte. However, the present invention does not limit the kind of the materials for the electrolyte.

Figure 3A:
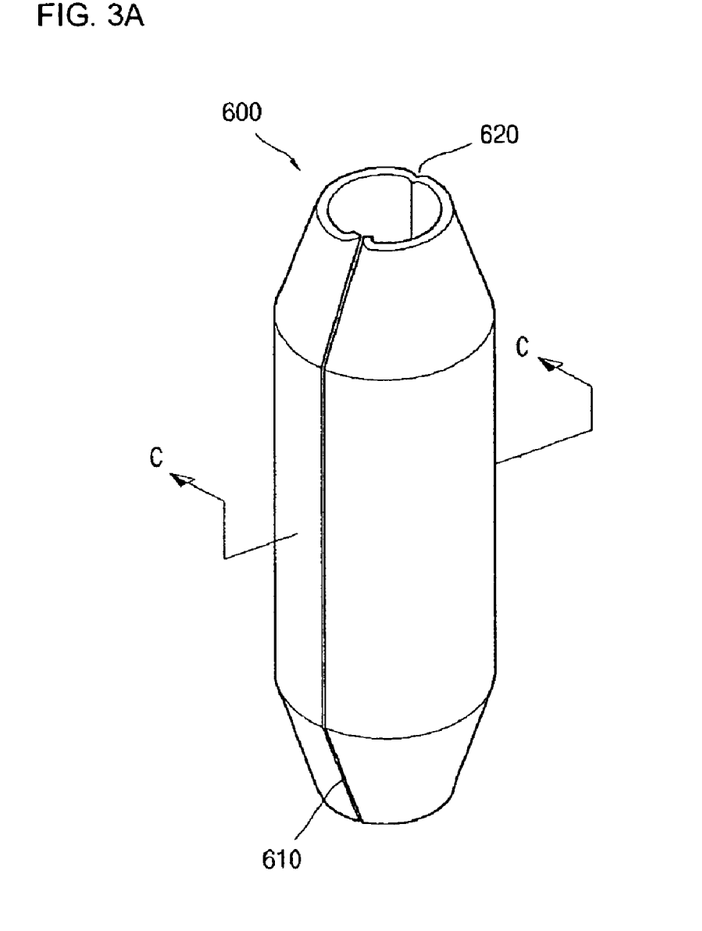
FIG. 3a is a perspective view illustrating a core member of a cylindrical lithium secondary battery according to one embodiment of the present invention.
Figure 3B:
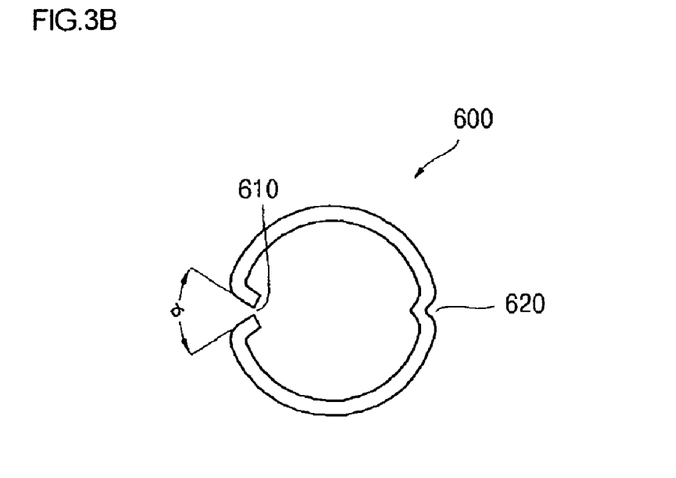

FIG. 3a is a perspective view illustrating the core member of the cylindrical lithium secondary battery according to one embodiment of the present invention, and FIG. 3b is a sectional view taken along line C-C shown in FIG. 3a.

Referring to FIGS. 3a and 3b, the core member 600 of the cylindrical lithium secondary battery 200 according to one embodiment of the present invention has a substantially tubular shape and is provided with a slit 610 formed lengthwise along the core member 600. Both side ends of the core member 600 defining the slit 610 therebetween are bent toward the inner portion of the core member 600 with predetermined inclination angles. At this time, the inclination angle α formed between both side ends of the core member 600 is preferably equal to or less than about 120°.

In addition, the core member 600 preferably includes a wrinkle or groove part 620, which is formed at an outer wall of the core member 600 lengthwise along the core member 600 and positioned opposite to the slit 610 on a circumference of a cross sectional plane of the core member 600.

The operation of the reinforcing structure can be explained that when external pressure is applied to the cylindrical lithium secondary battery, the wrinkle or groove part 620 distributes the external pressure, thereby preventing deformation from being concentrated on one spot of the core member 600, although the invention is not bound to this explanation or understanding limited hereto. That is, when the external pressure is applied to the cylindrical lithium secondary battery, the wrinkle or groove part 620 of the core member 600 serves as a deformation distribution member being subject to the deformation so that the deformation of the core member 600 cannot be concentrated on one spot of the core member 600, but may be distributed over the whole area of the core member 600. Therefore, the electrode assembly 300 can be prevented from being deformed or broken due to the deformation of the core member 600.

Figure 4A:
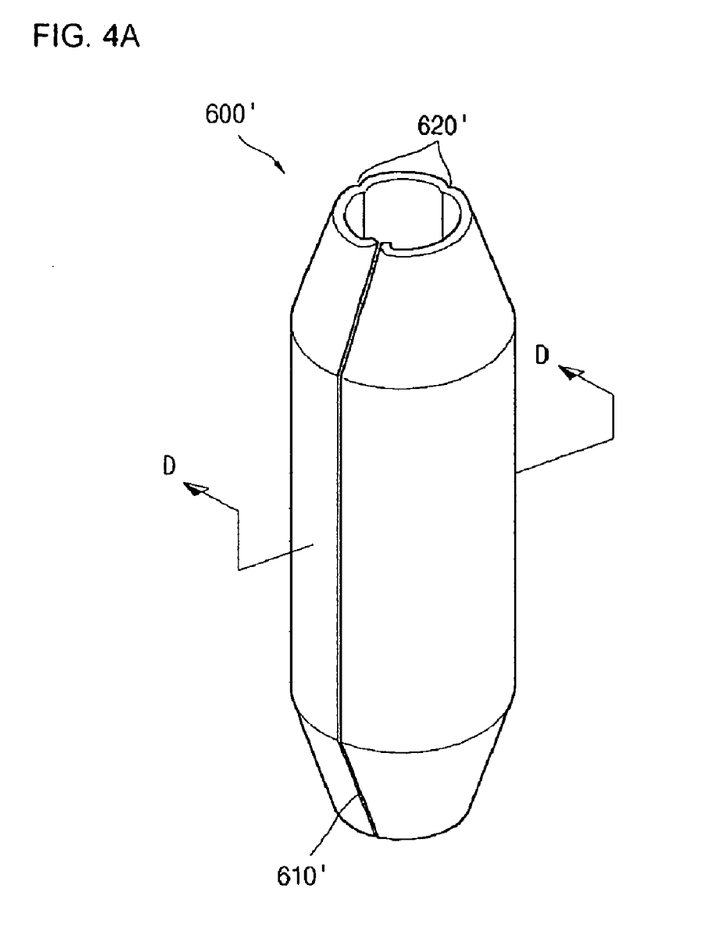
FIG. 4a is a perspective view illustrating a core member of a cylindrical lithium secondary battery according to another embodiment of the present invention.
Figure 4B:
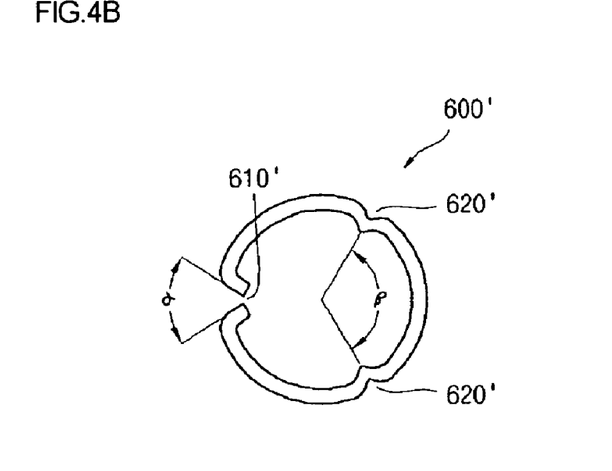

FIG. 4a is a perspective view illustrating a core member of a cylindrical lithium secondary battery according to another embodiment of the present invention, and FIG. 4b is a sectional view taken along line D-D shown in FIG. 4a.

Referring to FIGS. 4a and 4b, the core member 600' of the cylindrical secondary battery 200 according to another embodiment of the present invention has a structure substantially identical to that of the core member 600 of the cylindrical lithium secondary battery 200 according to one embodiment of the present invention shown in FIGS. 3a and 3b. However, according to another embodiment of the present invention, the core member 600' includes two wrinkle or groove parts 620' which are symmetrically formed lengthwise along the core member 600' about a transverse axis of a slit 610' on a circumference of a cross sectional plane of the core member 600'. That is, the core member 600' includes two deformation distribution members.

In detail, the core member 600' of the cylindrical lithium secondary battery 200 according to another embodiment of the present invention has a substantially tubular shape and the tubular core member 600' is provided with the slit 610' and two wrinkle or groove parts 620' serving as the deformation distribution members, which are formed lengthwise along the core member 600'.

At this time, both side ends of the core member 600' defining the slit 610' are bent toward the inner portion of the core member 600' with predetermined inclination angles. The inclination angle α formed between both side ends of the core member 600' is preferably equal to or less than about 120°.

In addition, two wrinkle or groove parts 620' serving as the deformation distribution members are preferably symmetrical to each other about the transverse axis of the slit 610' on the circumference of the cross sectional plane of the core member 600'. More preferably, a central angle β defined by two wrinkle or groove parts 620' is in a range of about 120 to about 240°.

Figure 5:
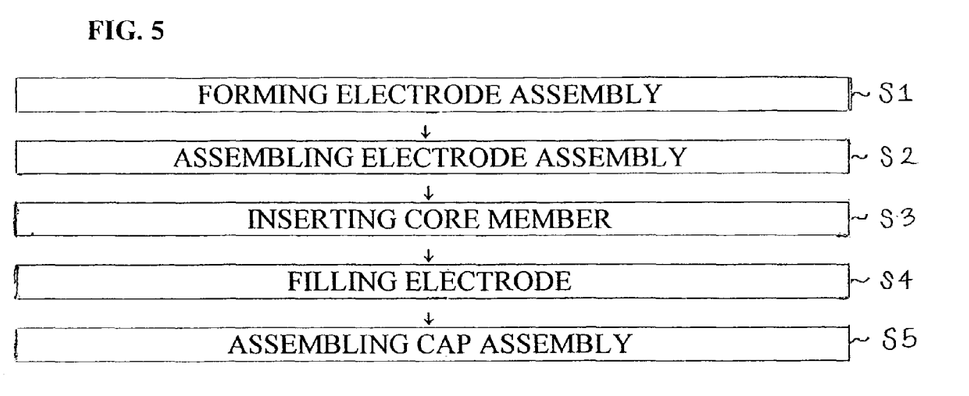
FIG. 5 is a block view illustrating the procedure for fabricating a cylindrical lithium secondary battery according to one embodiment of the present invention.

FIG. 5 is a block view illustrating the procedure for fabricating the cylindrical lithium secondary battery according to one embodiment of the present invention. Referring to FIG. 5, the procedure for fabricating the cylindrical lithium secondary battery according to one embodiment of the present invention includes the steps of forming the electrode assembly 300 (S1), assembling the electrode assembly 300 (S2), inserting the core member 600 (S3), filling or injecting the electrolyte (S4) and assembling the cap assembly 500 (S5).

FIGS. 6a to 6d are views for explaining a method for fabricating the cylindrical lithium secondary battery according to one embodiment of the present invention. Hereinafter, the method for fabricating the cylindrical lithium secondary battery according to one embodiment of the present invention will be described with reference to FIGS. 6a and 6b together with FIG. 3.

Figure 6A:
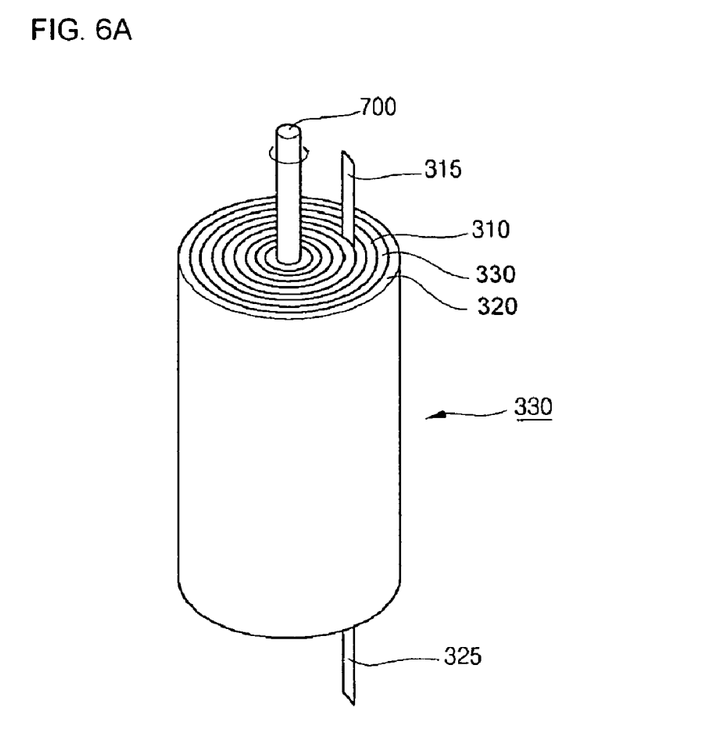
FIGS. 6a to 6d are views for explaining a method for fabricating a cylindrical lithium secondary battery according to one embodiment of the present invention.

Referring to FIG. 6a, in the step of forming the electrode assembly 300 (S1), the first electrode plate 310, the separator 330 and the second electrode plate 320 are sequentially stacked. Then, after coupling a winding shaft 700 to one end of the stacked structure, the stacked structure is wound in the form of a cylinder, thereby forming the electrode assembly 300. Before the stacked structure is wound, the first electrode tab 315 is attached to the first electrode plate 310 and the second electrode tab 325 is attached to the second electrode plate 320.

Figure 6B:
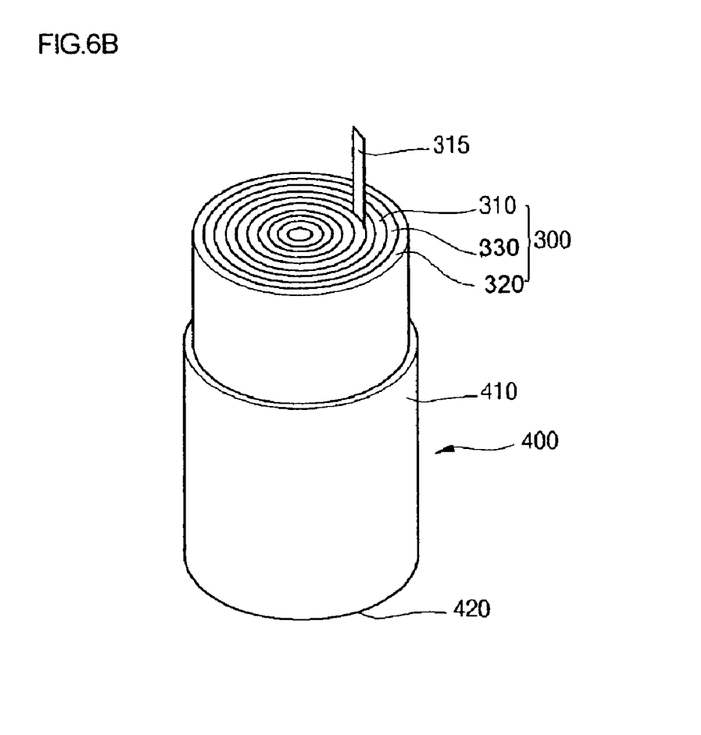

Referring to FIG. 6b, in the step of assembling the electrode assembly 300 (S2), the electrode assembly 300 having the substantially cylindrical shape is accommodated in the cylindrical case 400. After the electrode assembly 300 has been accommodated in the cylindrical case 400, the winding shaft 700 is separated from the electrode assembly 300. At this time, the cavity having the substantially cylindrical shape is formed at the center of the electrode assembly 300. The winding shaft 700 can be separated from the electrode assembly 300 before the electrode assembly 300 is accommodated in the cylindrical case 400. The present invention does not limit the order for the step of separating the winding shaft 700 from the electrode assembly 300. In addition, the lower insulating plate 341 (see, FIG. 6c) is previously coupled to the cylindrical case 400.

Figure 6C:
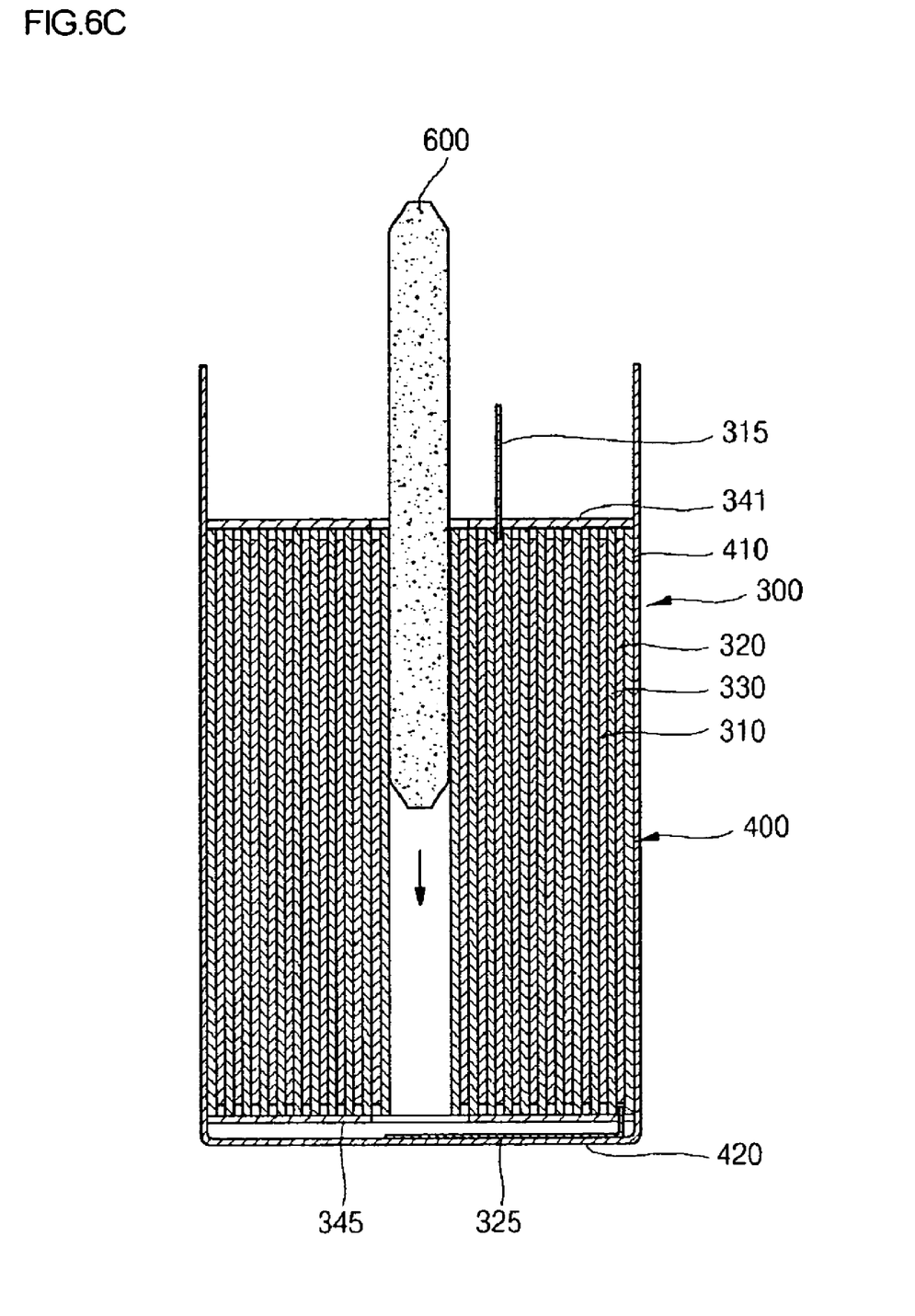

Referring to FIG. 6c, in the step of inserting the core member 600 (S3), the core member 600 as shown in FIGS. 3a and 3b or the core member 600' as shown in FIGS. 4a and 4b is inserted into the cavity, which is formed at the center of the electrode assembly 300 as the winding shaft 700 is separated from the electrode assembly 300.

Before the core member 600 is inserted into the cavity of the electrode assembly 300, one of the first and second electrode tabs 315 and 325, for example, the second electrode tab 325 can be previously attached to the lower surface 420 of the cylindrical case 400 by means of resistance welding or the like. Therefore, the core member 600 is positioned on the upper surface of the second electrode tab 325 so that the second electrode tab 325 can be strongly coupled to the cylindrical case 400 by means of the core member 600. In the meantime, as mentioned above, the core member 600 preferably has the height corresponding to approximately 90 to 110% of the height of the electrode assembly 300.

After that, in the step of filling or injecting the electrolyte (S4), the electrolyte is introduced into the cylindrical case 400 up to the upper end of the electrode assembly 300. The electrolyte serves as a medium for allowing the lithium ions to move between the first and second electrode plates 310 and 320 of the electrode assembly 300 during the charge/discharge operations.

Figure 6D:
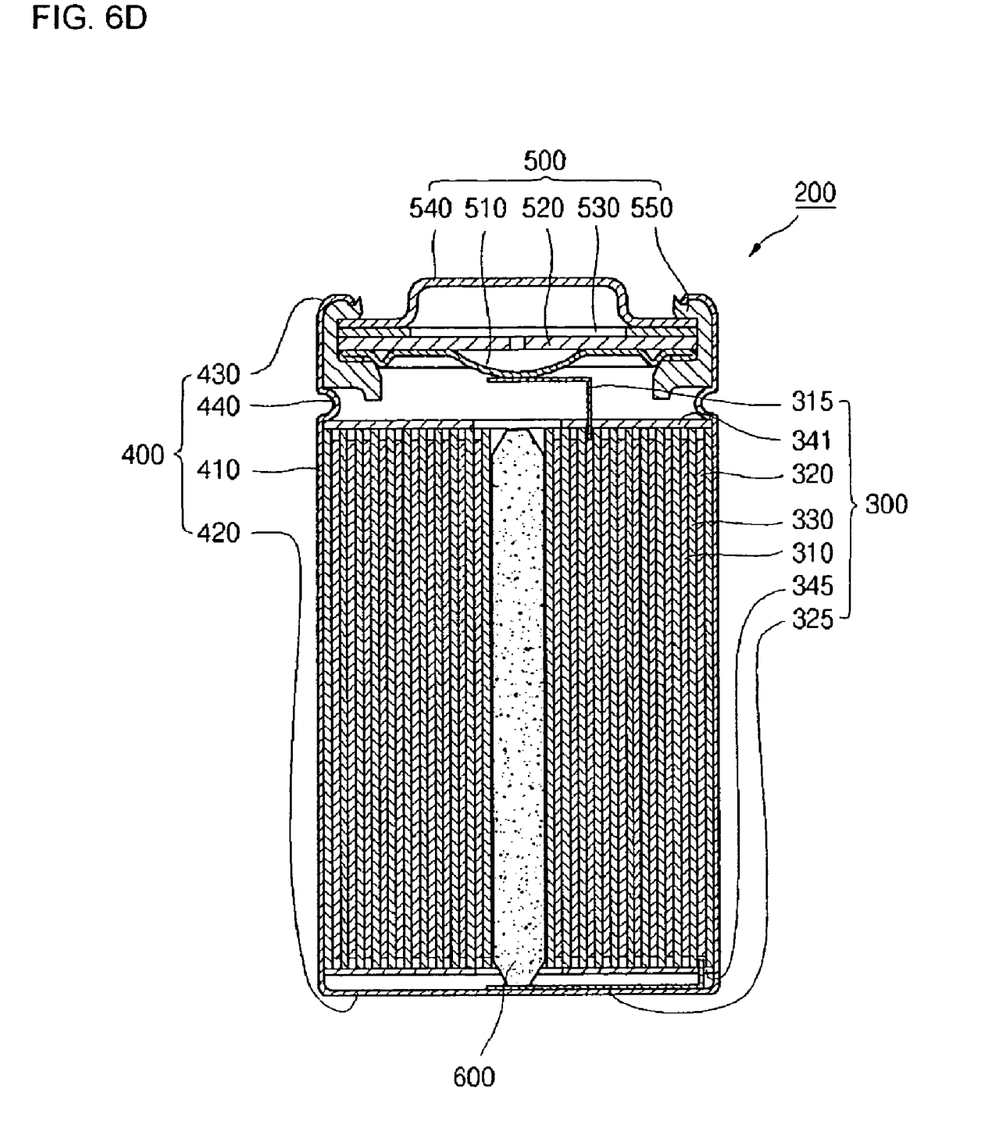

Referring to FIG. 6d, in the step of assembling the cap assembly 500 (S5), the cap assembly 500 consisting of a plurality of elements is assembled with the upper portion of the cylindrical case 400 in such a manner that the electrode assembly 300 and the core member 600 can be prevented from separating from the cylindrical case 400 while preventing the electrolyte from being leaked from the cylindrical case 400, thereby completing the fabrication of the cylindrical lithium secondary battery 200.

In detail, the insulating gasket 550 in the form of a ring is coupled to the upper portion of the cylindrical case 400 and then the conductive safety vent 510, which is electrically connected to one of the first and second electrode tabs 315 and 325 (for example, the first electrode tab 315), the PCB 520, the positive thermal coefficient device 530 and the electrode cap 540 of the electrode assembly 300 are sequentially assembled.

After that, the beading part 440, which is dented inward, is formed in the cylindrical case 400 by beading the predetermined portion of the cylindrical case 400 corresponding to the lower end of the insulating gasket 550. In addition, the crimping part 430 is formed in the cylindrical case 400 by crimping the upper end portion of the cylindrical case 400 such that the cap assembly 500 can be prevented from separating from the cylindrical case 400, thereby completing the fabrication of the cylindrical lithium secondary battery 200.

As described above, according to the cylindrical lithium secondary battery 200 of the present invention, the tubular shaped core member 600 or 600' includes at least one wrinkle or groove part 620 or 620', which is formed lengthwise along the tubular shaped core member 600 or 600' and serves as a deformation distribution member. Accordingly, the deformation is not concentrated on one spot of the tubular shaped core member 600 or 600' but distributed through the wrinkle or groove part 620 or 620' even if the core member 600 or 600' is deformed due to the external pressure applied thereto. Thus, the electrode assembly 300 can be prevented from being deformed or broken due to the deformation of the tubular shaped core member 600 or 600'. Therefore, it is possible to improve the stability of the cylindrical lithium secondary battery 200 according to the present invention against the external pressure.

As mentioned above, the present invention can provide the cylindrical lithium secondary battery capable of improving the stability thereof against the external pressure by distributing the deformation over the whole area of the core member through at least one wrinkle or groove part formed lengthwise along the core member.

Although exemplary embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. A battery comprising:
   a housing;
   an electrode assembly enclosed in the housing, the electrode assembly comprising a first electrode sheet, a second electrode sheet and at least one separator, which are rolled together generally about an axis to form a roll, the at least one separator being dielectrically interposed between the first and second electrode sheets in the roll; and
   a core placed in the center of the roll, the core comprising a substantially tubular-shaped wall surrounding the axis, the tubular-shaped wall comprising an outer surface facing the roll and an inner surface facing the axis, the inner surface defining a circumference, the core comprising at least one reinforcing structure formed in the tubular-shaped wall, the reinforcing structure being elongated in a direction extending along the axis;
   wherein the at least one reinforcing structure comprises at least one wrinkle in the wall, wherein the at least one wrinkle comprises a recess on the outer surface and a bulge on the inner surface;
   wherein the substantially tubular-shaped wall comprises a first edge extending along the axis and a second edge extending along the axis, wherein the first and second edges generally face each other with a gap therebetween, and wherein the bulge is substantially diametrically opposing the gap with respect to the central axis.

2. The battery of claim 1, wherein the direction is substantially parallel to the axis.

3. The battery of claim 1, wherein the direction is substantially tilted from the axis while extending along the axis.

4. The battery of claim 1, wherein the at least one reinforcing structure comprises a flange along at least one of the first and second edges, and wherein the flange extends along the at least one of the first and second edges.

5. The battery of claim 4, wherein the flange comprises a portion of the wall in the vicinity of the at least one of the first and second edges, and wherein the portion bends inwardly toward the axis.

6. The battery of claim 1, wherein the at least one reinforcing structure comprises a first flange along the first edge and a second flange along the second edge, and wherein the first flange and second flange extend substantially parallel to each other.

7. The battery of claim 6, wherein the first flange comprises an inwardly bent portion of the wall in the vicinity of the first edge, wherein the first flange comprises a first outer surface extended from the outer surface of the wall, wherein the second flange comprises an inwardly bent portion of the wall in the vicinity of the second edge, wherein the second flange comprises a second outer surface extended from the outer surface of the wall, wherein the first and second outer surfaces form an angle between tangential lines thereof, and wherein the angle is from about 60° to about 130°.

8. The battery of claim 1, wherein the core comprises two or more reinforcing structures elongated in a direction extending along the axis, wherein two of the reinforcing structures are distanced from each other such that the two reinforcing structures have an angle therebetween about the axis, and wherein the angle is from about 120° to about 180°.

9. The battery of claim 1, wherein the roll has a length along the axis, and wherein the core has a length along the axis, which is from about 90 to about 110% of the length of the roll.

10. The battery of claim 1, wherein the core comprises a substantially cylindrical portion.

11. A lithium secondary battery comprising:
   an electrode assembly comprising a first electrode plate, a second electrode plate and a separator interposed between the first and second electrode plates, the electrode assembly providing an elongated space in the center thereof;
   a core member comprising a tubular shaped body surrounding around and extending in a central axis thereof to define a circumference, the core member comprising a slit formed in the tubular shaped body and generally extending in the central axis, the core member further comprising at least one wrinkle formed in the tubular shaped body and generally extending in the central axis, the core member being placed in the elongated space;
   a case configured to receive the electrode assembly, the case having an opening; and
   a cap assembly configured to close the opening of the case;
   wherein the at least one wrinkle comprises a recess on the outer surface and a bulge on the inner surface of the tubular shaped body and is substantially diametrically opposing the slit with respect to the central axis.

12. A lithium secondary battery comprising:

an electrode assembly comprising a first electrode plate, a second electrode plate and a separator interposed between the first and second electrode plates, the electrode assembly providing an elongated space in the center thereof;

a core member comprising a tubular shaped body surrounding around and extending in a central axis thereof to define a circumference, the core member comprising a slit formed in the tubular shaped body and generally extending in the central axis, the core member further comprising two wrinkles formed in the tubular shaped body and generally extending in the central axis, the core member being placed in the elongated space;

a case configured to receive the electrode assembly, the case having an opening; and a cap assembly configured to close the opening of the case;

wherein each of the wrinkles comprises a recess on the outer surface and a bulge on the inner surface of the tubular shaped body;

and wherein the two bulges are substantially mirror-symmetrical with respect to an imaginary plane passing the central axis and the slit.

13. The battery of claim 12, wherein the two bulges form at an angle at the central axis in an imaginary plane perpendicular to the central axis, and wherein the angle is from about 120° to about 240°.

* * * * *